(12) United States Patent
Kong et al.

(10) Patent No.: US 8,554,785 B2
(45) Date of Patent: Oct. 8, 2013

(54) METHOD AND SYSTEM FOR MANAGING USER INFORMATION IN INSTANT MESSAGING SYSTEMS

(75) Inventors: Yongwei Kong, Hangzhou (CN); Jianxiang Mo, Hangzhou (CN); Zhiguang Xu, Hangzhou (CN); Ji Xu, Hangzhou (CN)

(73) Assignee: Alibaba Group Holding Limited (KY)

( * ) Notice: Subject to any disclaimer, the term of this patent is extended or adjusted under 35 U.S.C. 154(b) by 195 days.

(21) Appl. No.: 12/676,821

(22) PCT Filed: Sep. 26, 2007

(86) PCT No.: PCT/CN2007/070786
§ 371 (c)(1),
(2), (4) Date: Mar. 5, 2010

(87) PCT Pub. No.: WO2009/039702
PCT Pub. Date: Apr. 2, 2009

(65) Prior Publication Data
US 2010/0306246 A1    Dec. 2, 2010

(51) Int. Cl.
*G06F 17/30* (2006.01)
(52) U.S. Cl.
USPC ............ 707/769; 707/802; 709/203; 709/206
(58) Field of Classification Search
USPC ................................. 707/769; 709/206, 203
See application file for complete search history.

(56) References Cited

U.S. PATENT DOCUMENTS

| | | | |
|---|---|---|---|
| 6,643,360 B1 | 11/2003 | Reine | |
| 7,318,110 B2 | 1/2008 | Yumoto et al. | |
| 7,702,753 B2 | 4/2010 | Simongini et al. | |
| 8,200,755 B2 | 6/2012 | Fujimoto et al. | |
| 2003/0037103 A1* | 2/2003 | Salmi et al. | 709/203 |
| 2003/0083046 A1* | 5/2003 | Mathis | 455/412 |
| 2004/0205175 A1* | 10/2004 | Kammerer | 709/223 |
| 2005/0102365 A1* | 5/2005 | Moore et al. | 709/207 |

(Continued)

FOREIGN PATENT DOCUMENTS

| | | |
|---|---|---|
| CN | 1968536 A | 5/2007 |
| CN | 101090371 A | 12/2007 |

(Continued)

*Primary Examiner* — Wilson Lee
*Assistant Examiner* — Tiffany Thuy Bui
(74) *Attorney, Agent, or Firm* — Van Pelt, Yi & James LLP (57) ABSTRACT

The present disclosure discloses a method for managing user information in an instant messaging system in order to address the problems of increasing system workload, increasing network overhead and deteriorated system performance in existing technologies due to frequent access of user information management server or servers when user information is searched. According to a disclosed method, an access server obtains and stores information of contacts of a logged-in user; the access server notifies user information of the logged-in user to other access servers; the access servers that receive the notification store the user information of the logged-in user upon determining that contact(s) is/are found locally therein; and when the access server needs to obtain the information of the contacts of the user, the access server performs a search either locally or in other access servers. Furthermore, a communication system is also provided. The disclosed method and system are believed to result in greatly reduced frequency of searching user information in the user information management servers, reduced workload of the user information management servers, improved performance of searching user information and reduced network overhead of the system.

17 Claims, 9 Drawing Sheets

(56) References Cited

U.S. PATENT DOCUMENTS

| | | |
|---|---|---|
| 2005/0198124 A1* | 9/2005 | McCarthy ............... 709/203 |
| 2006/0101119 A1* | 5/2006 | Qureshi et al. ............ 709/206 |
| 2006/0142030 A1 | 6/2006 | Coskun et al. |
| 2006/0168037 A1 | 7/2006 | Audu et al. |
| 2006/0195532 A1* | 8/2006 | Zlateff et al. ............ 709/206 |
| 2006/0288077 A1 | 12/2006 | Chen |
| 2007/0011230 A1 | 1/2007 | Clech et al. |
| 2007/0083675 A1* | 4/2007 | Vemulapelli et al. ....... 709/206 |
| 2007/0124386 A1 | 5/2007 | Klassen |
| 2007/0208816 A1* | 9/2007 | Baldwin et al. ........... 709/206 |
| 2007/0288852 A1* | 12/2007 | Fish ..................... 715/753 |
| 2008/0098060 A1 | 4/2008 | Boni et al. |
| 2008/0133580 A1 | 6/2008 | Wanless et al. |
| 2008/0201419 A1 | 8/2008 | Hung et al. |
| 2009/0049190 A1* | 2/2009 | Jiang et al. ............... 709/238 |
| 2009/0083382 A1 | 3/2009 | Rosenberg et al. |

FOREIGN PATENT DOCUMENTS

| | | |
|---|---|---|
| JP | 2006209193 | 8/2006 |
| JP | 2006244100 | 9/2006 |
| WO | WO2005036841 A1 | 4/2005 |

\* cited by examiner

METHOD AND SYSTEM FOR MANAGING USER INFORMATION IN INSTANT MESSAGING SYSTEMS

RELATED APPLICATIONS

The present application claims priority benefit of international patent application No. PCT/CN2007/070786, filed Sep. 26, 2007, entitled "METHOD AND SYSTEM FOR MANAGING USER INFORMATION IN INSTANT MESSAGING SYSTEMS", which is hereby incorporated in its entirety by reference.

TECHNICAL FIELD

The present disclosure is directed to instant messaging technologies in the fields of communications and computer, and more particularly to management of user information in an instant messaging system.

BACKGROUND

In an instant messaging system, a user needs to obtain online information of the user's buddies upon logging in the instant messaging system. Meanwhile, login information of the user is sent to those users who have added the user as their buddy. If the online status of the user changes, information regarding change of the online status of the user also needs to be sent to those users who have added the user as their buddy.

With regards to management of user online information, a centralized management approach under current techniques typically employs a designated user information management server to manage the user online information. When a user logs in a system, the user's login information is sent to and managed by the user information management server. Whether it is during user login, change of online status after a user's login, or exchange of instant messages between users, any searching for the online information of the user's contacts needs to go through the user information management server. Therefore, not only the workload of the user information management server is increased, but the network overhead is also greatly increased.

With an ever-increasing number of online users in large-scale instant messaging systems, a single user information management server is no longer able to meet the demand of centralized management of all the user online information. Online information of the users is distributed amongst multiple user information management servers. A search for user online information thus needs to be carried out on multiple user information management servers, resulting in decreased search efficiency. As the number of users further increases, the search efficiency of user information management servers will further decrease substantially. This leads to the deterioration of the management of user online information, which becomes the bottleneck of the entire instant messaging system.

SUMMARY

The present disclosure provides a method and a system for management of user information in an instant messaging system in order to address the issues of increased system workload, increased network overhead and impacted system performance arising from frequent access of user information management server(s) when user information is searched under current techniques.

The present disclosure provides the following technical scheme:

A method for managing user information in an instant messaging system includes the following steps:

an access server obtains and stores information of contacts of a logged-in user; the access server notifies other access servers of user information of the logged-in user;

when a notified access server determines that it has contact(s) of the logged-in user locally, it stores user information of the logged-in user; and When an access server needs to obtain information of contact(s) of a user, the access server performs a search either locally or in other access servers.

The access server further sends status information of the contacts of the logged-in user to a client terminal where the logged-in user is at. The other access servers that have the user information of the logged-in user stored thereon further send status information of the logged-in user to related contacts.

The information of the contacts of the logged-in user includes the user's buddy information and reverse buddy information.

Preferably, a buddy table that is used for storing the buddy information of the user and a reverse buddy table that is used for storing the reverse buddy information of the user are established in the access server. The buddy table associates an identifier of the user with local buddy information of the user. The reverse buddy table associates the identifier of the user to reverse buddy information of the user and records position information of the user.

Obtaining and storing the information of the contacts of the logged-in user by the access server includes the following steps:

the access server to which the user logs in finds identifiers of buddies and identifiers of reverse buddies of the logged-in user from a database;

the access server searches the identifiers of the buddies in the reverse buddy table, and records the user identifier of the login user in associated reverse buddy information upon finding the identifies of the buddies; and the access server searches the identifiers of the reverse buddies in the buddy table, and records the user identifier of the login user in associated buddy information upon finding the identifies of the reverse buddies.

Preferably, if an identifier of a buddy is not found in the reverse buddy table, the identifier of the buddy is recorded in the reverse buddy table, and the user identifier of the login user is treated as reverse buddy information and is associated with the identifier of the buddy.

If an identifier of a reverse buddy is not found in the buddy table, the identifier of the reverse buddy is recorded in the buddy table and the user identifier of the logged-in user is treated as buddy information and is associated with the identifier of the reverse buddy.

More preferably, after the user logged in, the method further includes the steps:

the access server searches the user identifier in a local buddy table therein, and obtains identifiers of all associated local buddies from corresponding buddy information upon finding the identifier;

Record position information of the access server in respective position information that is associated with the identifiers of the associated local buddies in the reverse buddy table.

Preferably, after the access server notifies the user information of the logged-in user to the other access servers and the access servers that receive the notification find the identifier of the logged-in user, the position information of the logged-in user is recorded in position information that is associated with the identifier, and the status information of the logged-in user is sent to related users based on user identifiers in the reverse buddy information that is associated with the identifier.

Preferably, the method further includes: when the access server requests the status information of the logged-in user from the other access servers, the other access servers find the identifier of the login user from respective local buddy tables and return user identifiers in buddy information that is associated with the identifier of the logged-in user to the access server.

Preferably, the method further includes: the access server searches for, within the local reverse buddy table therein, the user identifiers returned by the other access servers, and records the position information of the users in respective associated position information upon finding the user identifiers.

Preferably, when the status of the logged-in user changes, the access server notifies information regarding the status change of the user to the other access servers. Upon finding the identifier of the logged-in user in respective reverse buddy tables, the access servers that receive the notification send the information regarding the status change of the login user to the related users based on user identifiers in the reverse buddy information that is associated with the identifier.

When the user status of the logged-in user changes to "logout", the access server further removes information of the logged-in user that is associated the user identifier from the buddy table and the reverse buddy table in the present server. Upon finding the identifier of the logged-in user in respective reverse buddy tables, the access servers that receive the notification further clear respective position information that is associated with the identifier of the logged-in user.

When the logged-in user sends an instant message to a contact and the access server finds an identifier of the contact in the reverse buddy table therein, the access server transmits the instant message based on position information associated with the identifier of the contact.

If the access server cannot find the identifier of the contact in the reverse buddy table in the present server, the access server requests information of the contact of the user from the other access servers and transmits the instant message based on the information of the contact.

The access server sends notifications and requests to the other access servers by means of multicasting.

A communication system, characterized in that, the system includes:

a plurality of access servers, each access server being used for obtaining and storing information of contacts of a logged-in user, notifying user information of the logged-in user to other access servers, searching information of the contacts of the user either locally or in the other access servers, and transmitting an instant message;

A user client that accesses an instant messaging system through an access server, finds the information of the contacts from the access server, and sends and receives the instant message through the access server.

The access server includes a buddy table that is used for storing buddy information of the user and a reverse buddy table that is used for storing reverse buddy information of the user. The buddy table includes an identifier of the user and information of the user's buddies that are local to the access server. The reverse buddy table includes the user identifier, the reverse buddy information of the user and position information of the user.

The present disclosure manages user information by establishing a buddy table that is used for storing buddy information of a user and a reverse buddy table that is used for storing reverse buddy information of the user in an access server, thus greatly reducing the frequency of searching user information in the user information management servers. Not only is the workload of the user information management servers reduced, but the performances of searching user information and managing online information of the users are also improved. Moreover, network overhead of the system is alleviated.

DETAILED DESCRIPTION

In order to address issues such as decreased efficiency in user information search, large workload on user information management servers and deteriorated performance in the management of user online information in existing instant messaging systems, a buddy table and a reverse buddy table of users are established in an access server for managing information of the users and their respective contacts. A search for user information can be performed directly on the access server.

The present disclosure is described in details below with reference to the figures.

Figure 1A:
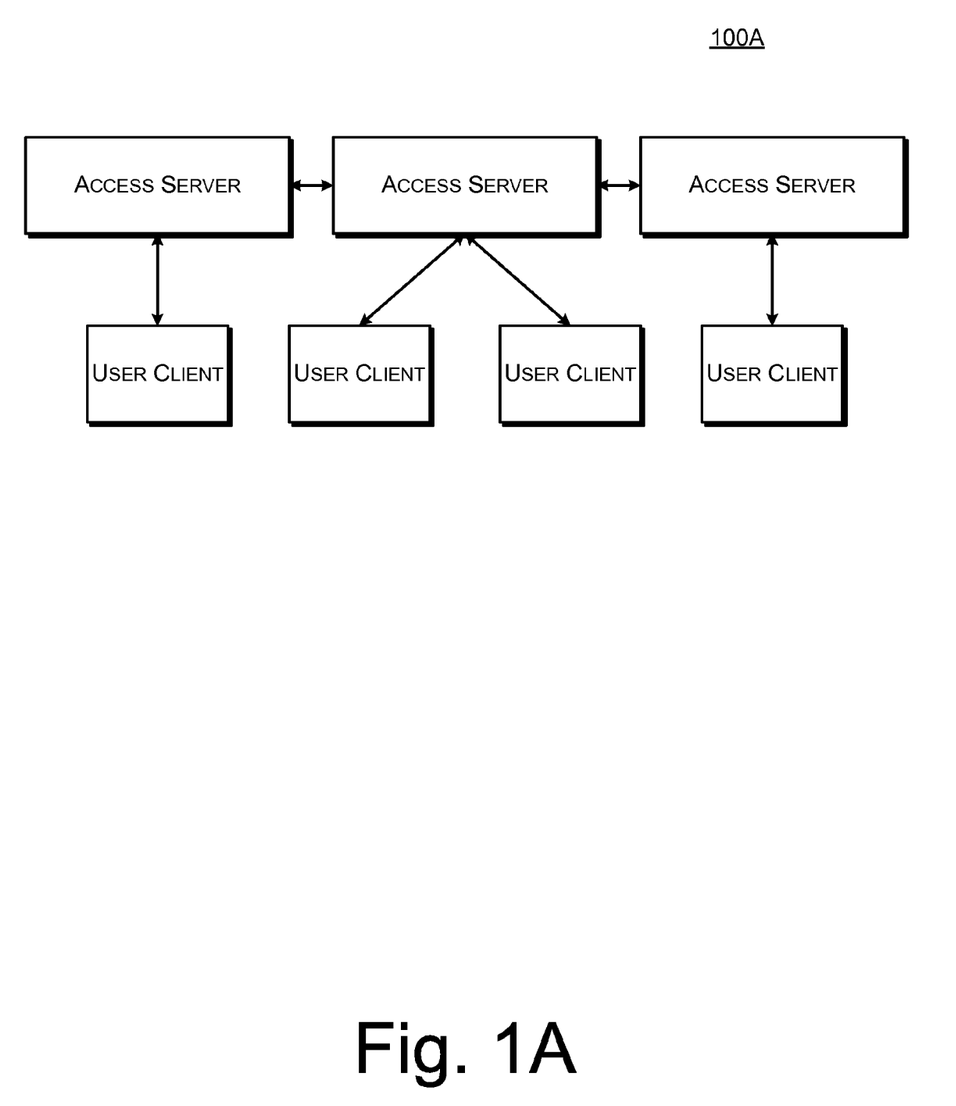
FIG. 1A shows a structural schematic diagram of a system in accordance with the present disclosure.

As shown in FIG. 1A, a communication system 100A in one embodiment includes a plurality of access servers and a plurality of client terminals for user login that are communicatively coupled to the access servers through a network.

Each access server obtains and stores information of contacts of users who are logged in, notifies the other access servers of the user information of a logged-in user, searches locally for information of a user's contacts, and transmits instant messages.

Through the access servers, the client terminals of the logged-in users access an instant messaging system, search for information of respective contacts, and send instant messages to respective contacts.

Upon login, a user is connected to a server of the system 100A that forms a UDP multicast group with multiple other servers. Each server in the group can receive multicast UDP messages from other servers in the group.

A buddy table that stores the buddy information of the users and a reverse buddy table that stores the reverse buddy information of the users are established in the access servers.

Figure 1B:
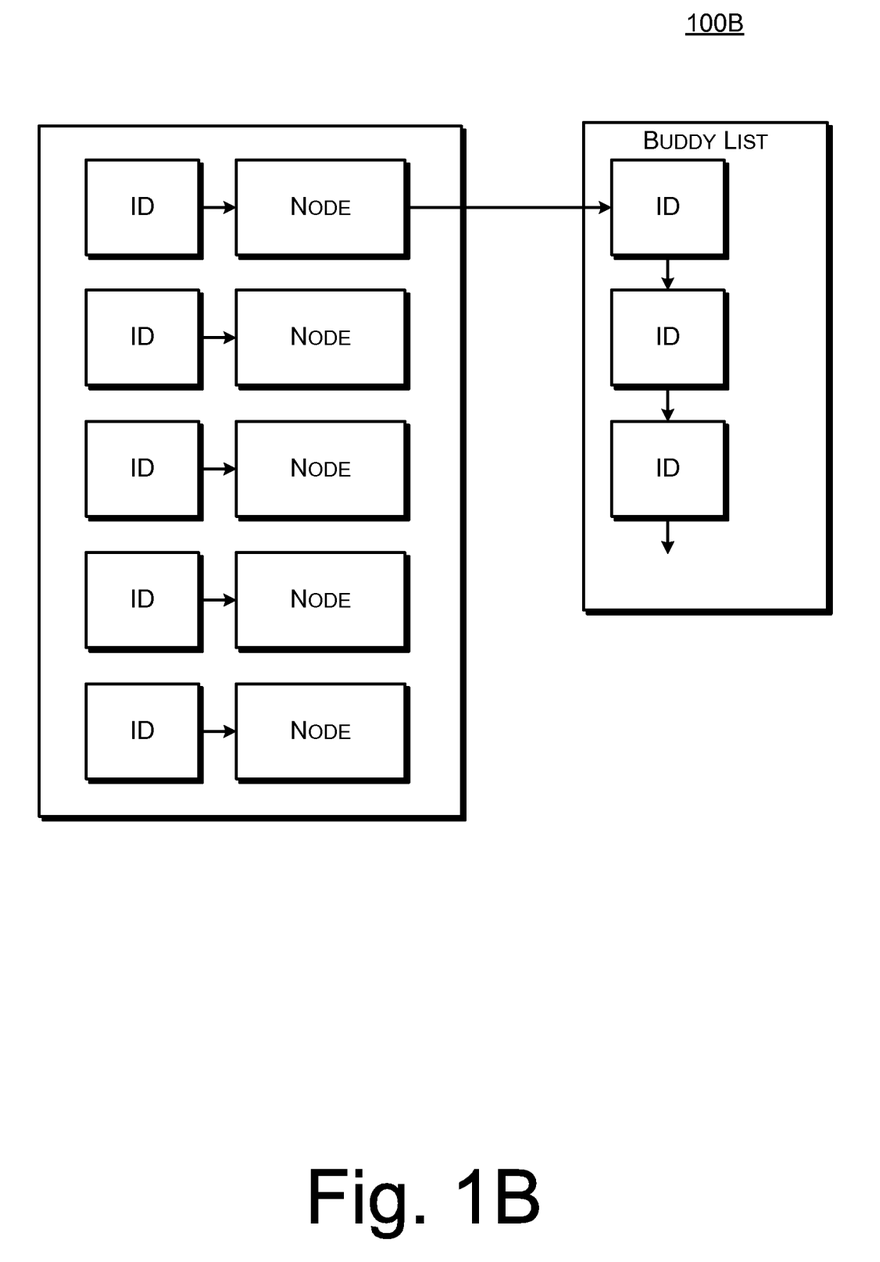
FIG. 1B shows a structural schematic diagram of a buddy table in accordance with the present disclosure.
Figure 1C:
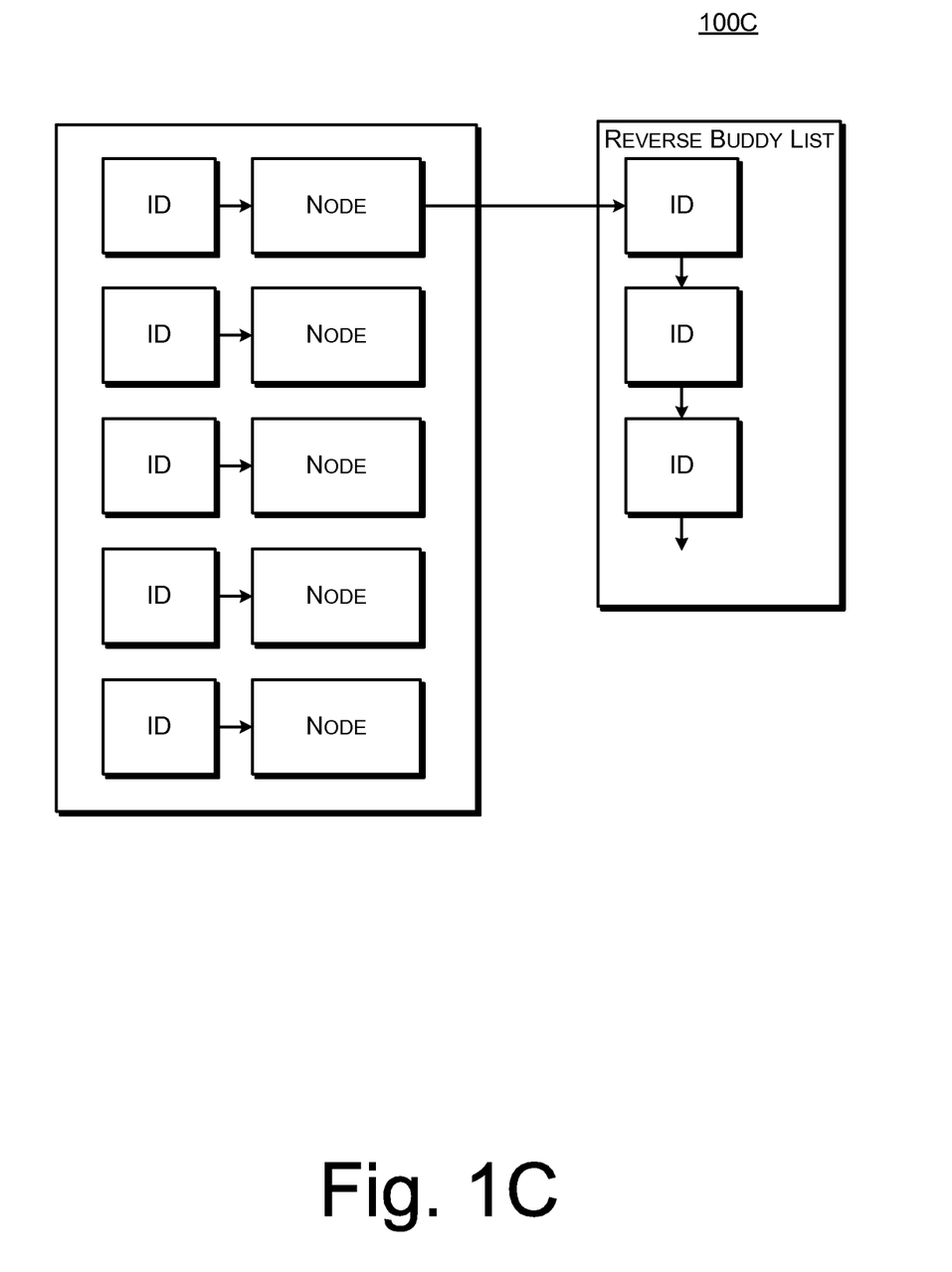
FIG. 1C shows a structural schematic diagram of a reverse buddy table in accordance with the present disclosure.

The buddy table links the local buddy information of the users through respective user identifiers. The reverse buddy table links the reverse buddy information of the users through respective user identifiers and records respective location information of the users.

The buddy table and the reverse buddy table employ user identifications as indices. A reverse buddy refers to a user who adds another user as his/her buddy. For example, User A adds User B as his/her buddy. User B is then a buddy of User A while User A is a reverse buddy of User B. The buddy table on a given server is used for searching buddy information of a certain user on that server. The structure of a buddy table 100B is shown in FIG. 1B. Within the buddy table 100B there are nodes of user identifier ID, with each node having a corresponding buddy list that records the local buddy information of a respective user.

When searching for buddies of a given user on a server, a node associated with that user in the buddy table of the server is searched to find the local buddy information of that user corresponding to the record of the node.

When every user logs in a server, the reverse buddy information of the respective user is obtained. In the buddy table of the server to which the respective user is connected, information of the user is recorded in the buddy lists of the nodes of the respective user's reverse buddies. For instance, User A is a buddy of User B's and User C's. When User A accesses the instant messaging system through Server A, the identifications of the reverse buddies of User A, namely User B and User C, are found from a database. The information of User A is then recorded in the buddy lists of the nodes of User B and User C that are in the buddy table of Server A. The recording process includes: searching for a node of User B in the buddy table of Server A; establishing a node of User B in the buddy table if such a node of User B does not exist; and recording the information of User A in the buddy list of the node of User B; searching for a node of User C in the buddy table; and recording the information of User A directly in the buddy list of the node of User C if the node of User C already exists. Accordingly, when User A logs in the instant messaging system, the information of User A is recorded in the buddy lists of the nodes of User B and User C in the buddy table of Server A.

The reverse buddy table is used for searching those users of a given server that have added a certain user as their buddy. A structure of a reverse buddy table 100C is shown in FIG. 1C. A reverse buddy table includes nodes of user identifier ID and information indicative of the server (POS) associated with a given user. A list corresponding to each individual node records the information of local reverse buddies of the users.

By searching the node of a user in the reverse buddy table of the server, information of the recorded reverse buddies of the user on that server and information of the respective server associated with the user (POS) can be found.

When every user logs in a server, the buddy information of the respective user is obtained. In the reverse buddy table of the server to which a user is connected, information of the user is recorded in the reverse buddy lists of the nodes of that user's buddies. For example, User A is a reverse buddy of User B and User C. User A and User B access an instant messaging system through Server A and Server B, respectively, and User C is offline. When User A accesses the instant messaging system through Server A, the identifications of User A's buddies, namely User B and User C, are found from a database. The information of User A is then recorded in the reverse buddy lists of the nodes of User B and User C that are in the reverse buddy table of Server A. The recording process includes: searching for a node of User B in the reverse buddy table of Server A; if no node of User B exist, establishing a node of User B in the reverse buddy table; recording the POS of User B to be Server B; and recording the information of User A in the reverse buddy list of the node of User B; searching for a node of User C in the reverse buddy table; if the node of User C exists, recording a blank as the POS of User C; and recording the information of User A directly in the reverse buddy list of the node of User C. Accordingly, when User A logs in the instant messaging system, User A, being a reverse buddy of User B and User C on Server A, is recorded in the reverse buddy lists of the nodes of User B and User C that are in the reverse buddy table of Server A. At the same time, the information of the respective server of User B and the respective server of User C is also recorded in the reverse buddy table.

Figure 2:
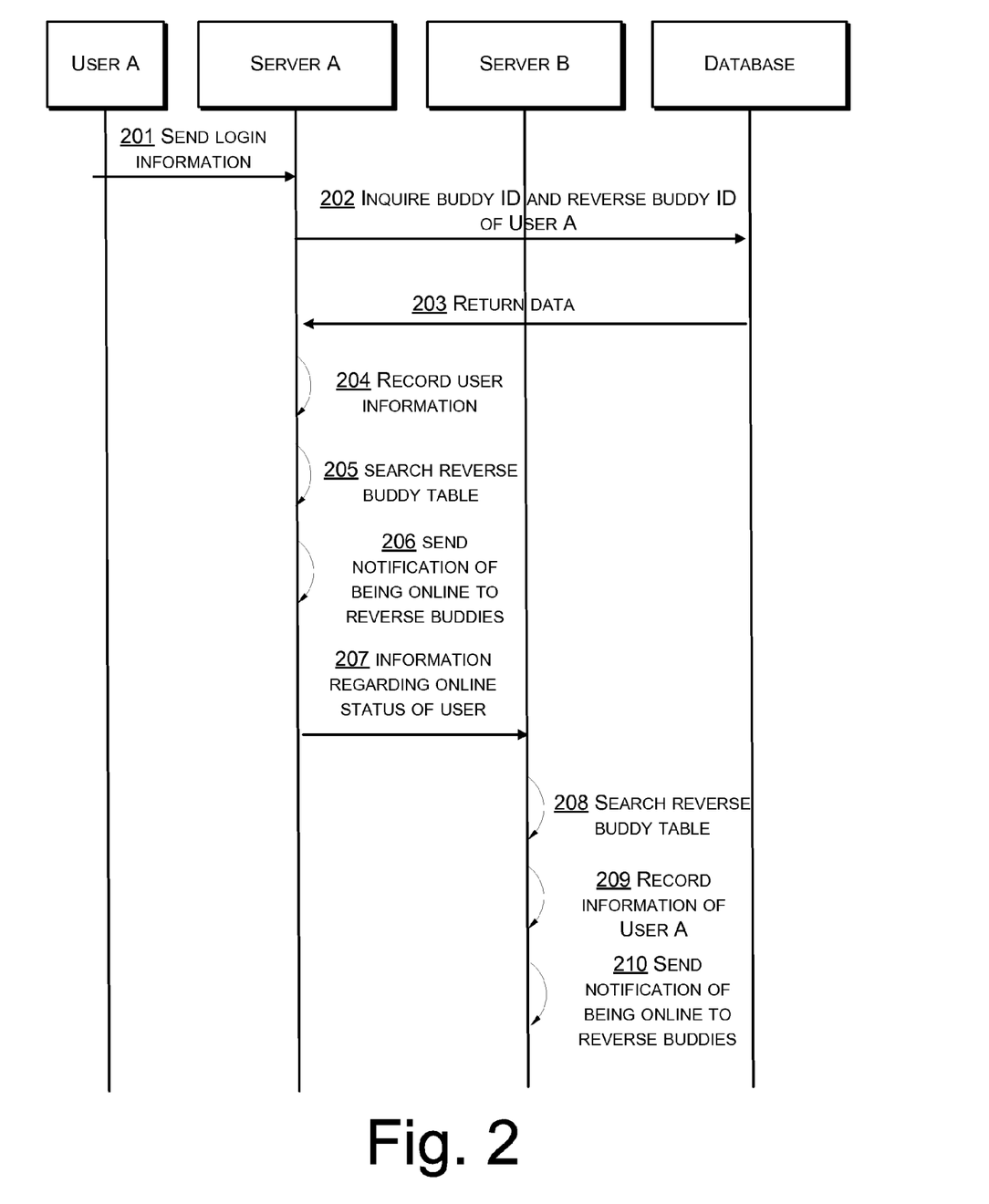
FIG. 2 shows a timing sequence diagram of handling a user login process in accordance with the present disclosure.

FIG. 2 shows a process 200 of handling a user access to a server, which includes the following:

Step 201: User A sends login information to Server A as User A is connected to Server A.

Step 202: Server A inquires identifications of buddies and reverse buddies of User A from a database.

Step 203: Server A receives the identifications of buddies and reverse buddies of User A obtained from the database.

Step 204: Based on the buddy identification, nodes of the buddies are found in a reverse buddy table of Server A. Information of User A is then recorded in respective reverse buddy lists of the nodes of the buddies. Based on reverse buddy identification, nodes of the reverse buddies are found in a buddy table of Server A. Information of User A is then recorded in respective buddy lists of the nodes of the reverse buddies.

Step 205: Prior to sending a notification that User A is online to the reverse buddies of User A that are local to the present server, Server A searches for User A in the reverse buddy table of the present server. If no node of User A exists, indicating that no reverse buddies of User A exist in the present server, no processing is performed. If a node of User A exists, position information of server of User A in the reverse buddy list of the node of User A will be changed to Server A. Reverse buddy identification are found from the reverse buddy list of the node of User A.

Step 206: Server A sends a notification that User A is online to related users based on the reverse buddy identification that have been found.

Step 207: When Server A sends the notification that User A is online to other access servers, Server A sends the online information of User A in the instant messaging system by way of UDP multicasting.

Step 208: Upon receiving the multicasting message, Access Server B in the instant messaging system examines whether User A exists in a reverse buddy table of the present server. If User A does not exist, indicating that no reverse buddies of User A exist in the present server, no processing is performed. If User A exists, step 209 is performed.

Step 209: Position information of server of User A in the reverse buddy table of Server B is modified to be Server A. Reverse buddy identification are then found in a reverse buddy list of the node of User A.

Step 210: Server B sends a notification that User A is online to related users based on the reverse buddy identification that have been found.

Using the above processing, after User A logs in the instant messaging system, the server to which User A connects stores the information of User A and the information of the contacts of User A. At the same time, the reverse buddies of User A obtain the information of User A.

Figure 3:
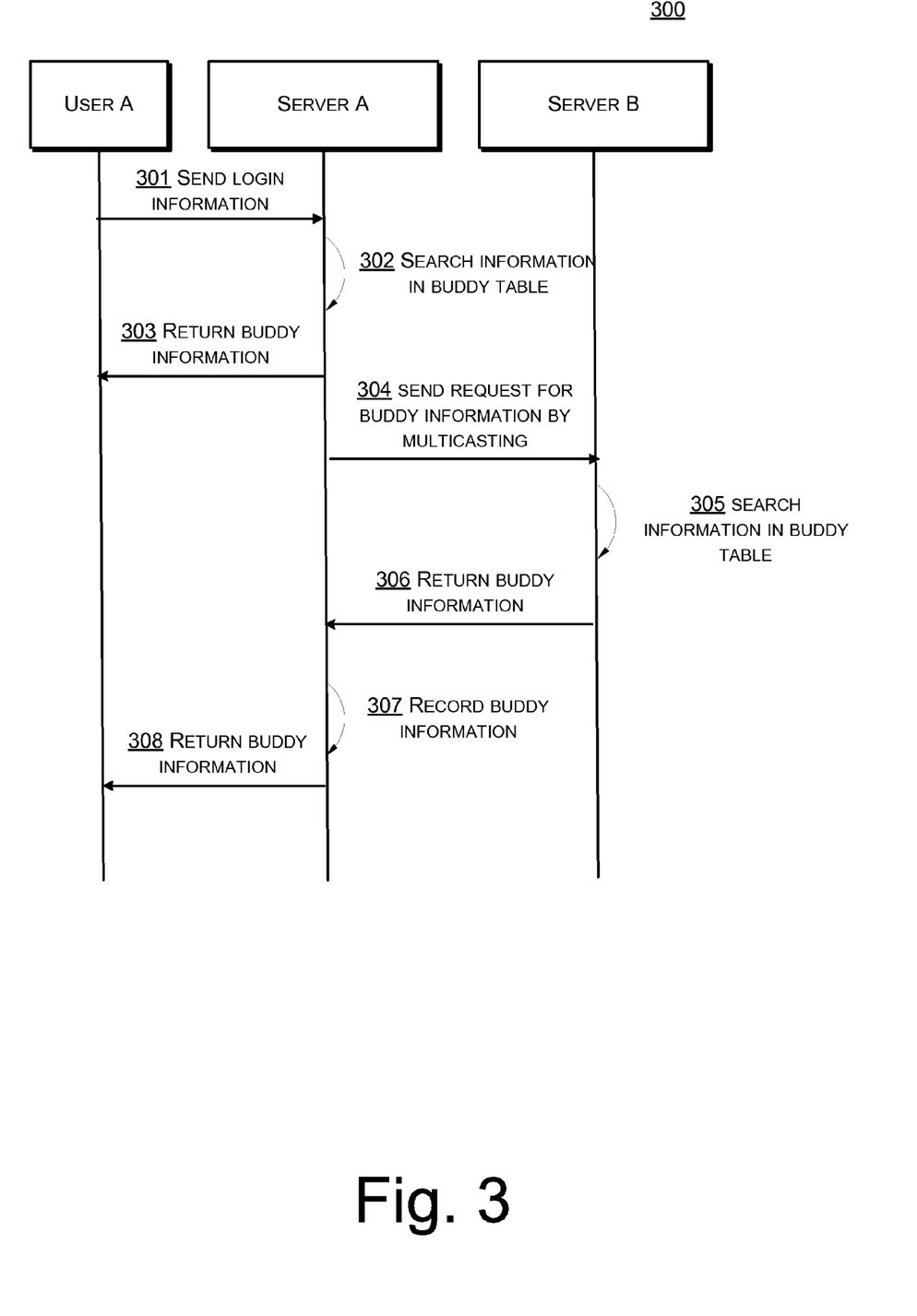
FIG. 3 shows a timing sequence diagram of handling a search of online buddy information for a user in accordance with the present disclosure.

FIG. 3 shows a process 300 of searching online information of buddies after User A logs in an instant messaging system. The process 300 includes the following:

Step 301: User A logs in Server A.

Step 302: Server A searches for a node of User A in the buddy table therein, and finds buddy identification that are recorded in the buddy list of the node. Based on the buddy identification, nodes of the buddies are found in a reverse buddy table of Server A, and corresponding position information of server that is recorded in these nodes is changed to Server A. Information regarding the online status of the buddies is examined.

Step 303: Server A returns to User A the information regarding the online status of the buddies of User A that are local to the present server.

Step 304: Server A submits a request for the information regarding the online status of the buddies of User A in the instant messaging system by way of multicasting.

Step 305: Upon receiving the multicasting message, Server B in the instant messaging system examines whether a node of User A exists in the buddy table of the present server and whether any buddies of User A exist in the present server. If exist, step 306 is performed. Otherwise, no processing is performed.

Step 306: Server B sends the information regarding the online status of the buddies of User A found therein to Server A.

Step 307: Based on the information of the buddies of User A that has been returned from Server B, Server A records the reverse buddy table therein the respective position information of server of the buddies of User A that are found on Server B to be Server B.

Step 308: Server A returns the information regarding the online status of the buddies of User A that has been received from Server B to User A.

Figure 4:
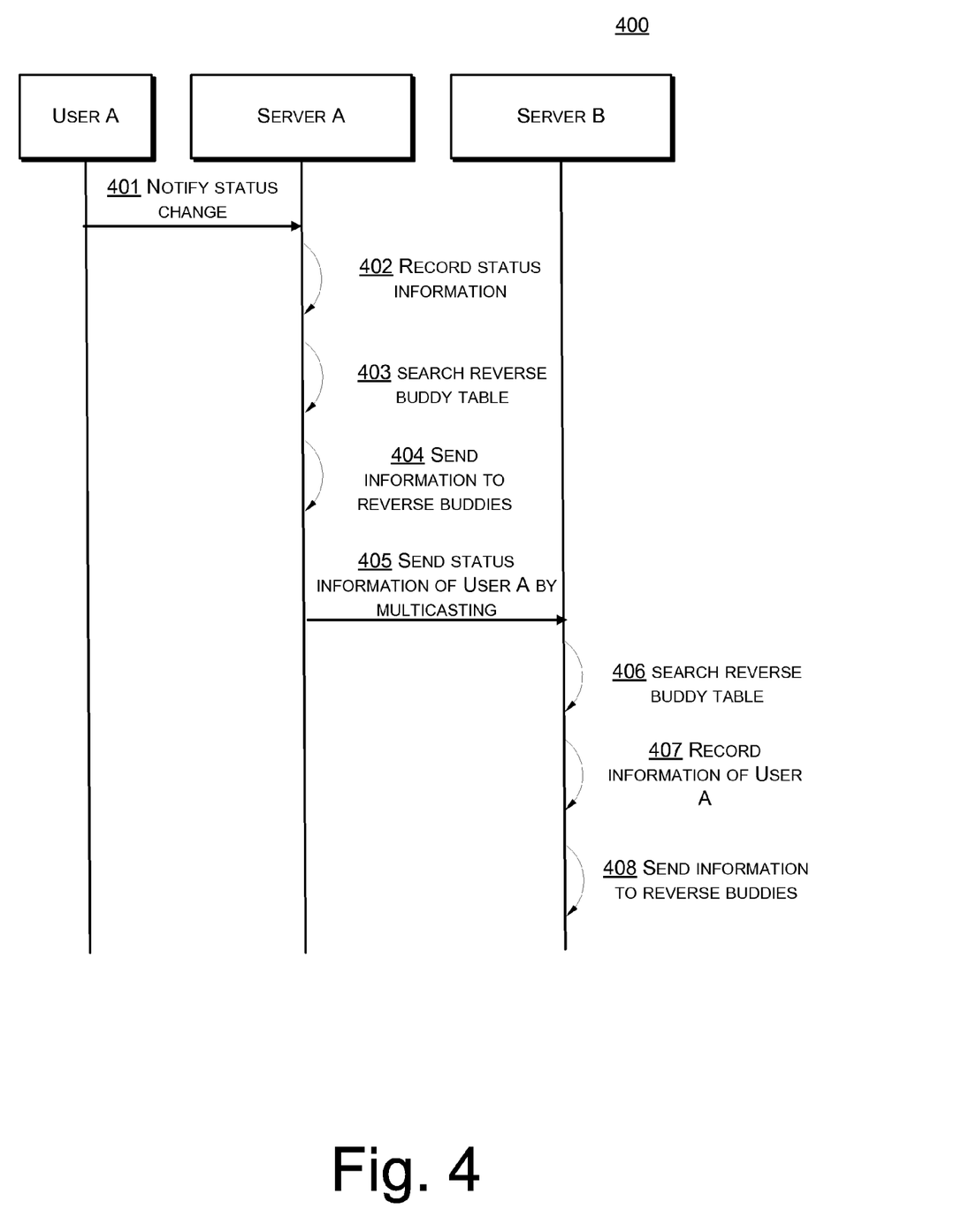
FIG. 4 shows a timing sequence diagram of handling a notification regarding an online status change of a user in accordance with the present disclosure.

FIG. 4 shows a process 400 of changing an online status of a user to invisible login. The process 400 includes the following:

Step 401: User A of Access Server A submits a message indicating changing online status to invisible to Server A.

Step 402: Server A records the status of User A in a local buddy table and a reverse buddy table therein to be invisible login.

Step 403: Server A examines whether a node of User A exists in the reverse buddy table of the present server. If such a node exists, reverse buddy identification are found in the reverse buddy list of that node, and step 404 is subsequently performed. Otherwise, no processing is performed.

Step 404: Based on the reverse buddy identification that have been found, Server A sends a message indicating the status change of User A to related users.

Step 405: Server A sends the message indicating the status change of User A in the instant messaging system by way of multicasting.

Step 406: Upon receiving the multicasting message, Server B in the instant messaging system examines whether a node of User A exists in a reverse buddy table of the present server. If a node of User A exists in a reverse buddy table of the present server, reverse buddy identification is found in the reverse buddy list of the node of User A, and step 407 is performed. Otherwise, no processing is performed.

Step 407: Server B records within the reverse buddy table Server A as the position information of server of User A.

Step 408: Based on the reverse buddy identification that have been found, Server B sends a message indicating the status change of User A to related users.

Figure 5:
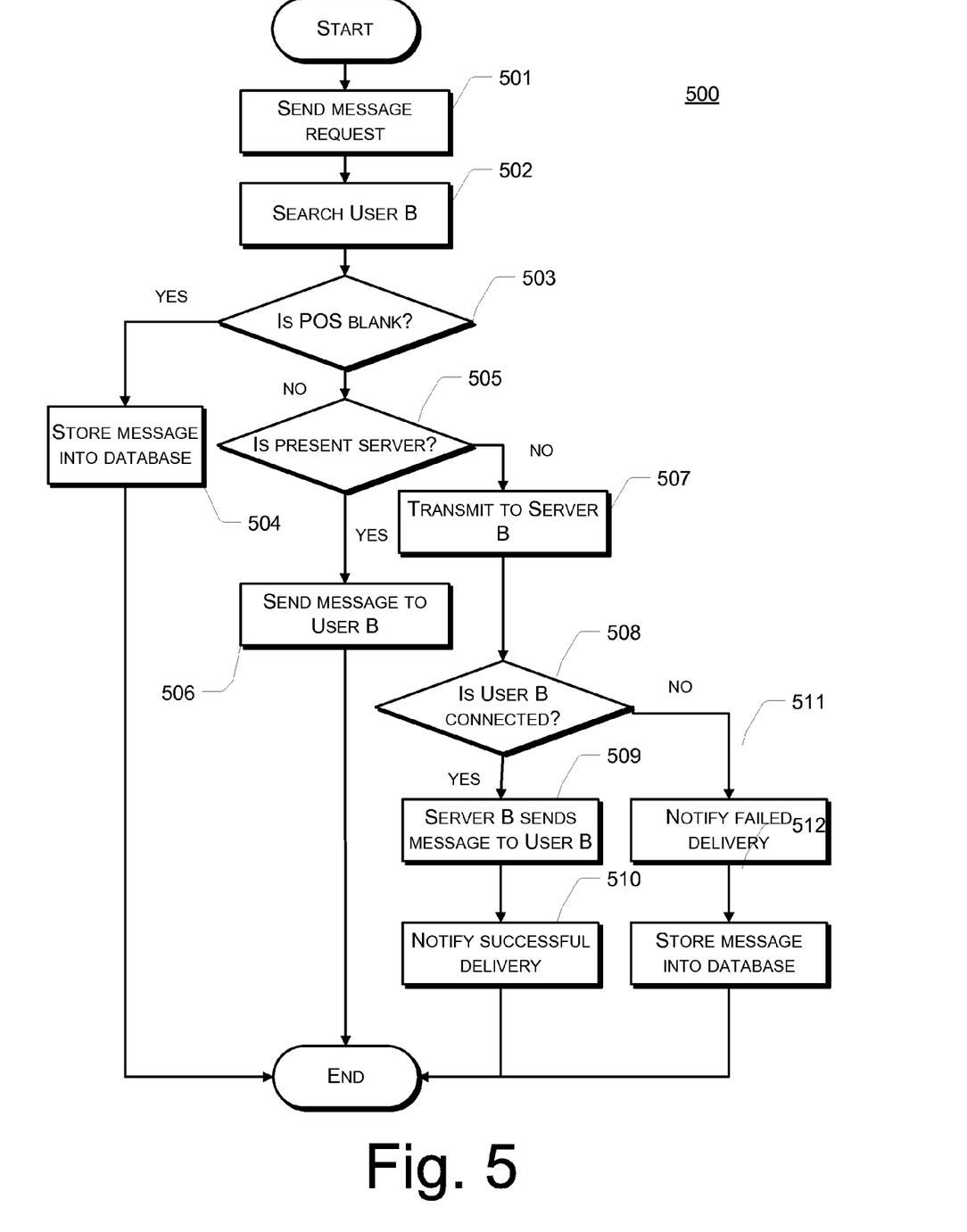
FIG. 5 shows a flow chart of a process of sending a message from a user in accordance with the present disclosure.

FIG. 5 shows a process 500 of sending a message from User A of Access Server A to a buddy User B. The process 500 includes the following:

Step 501: User A who connects with Server A requests Server A to send a message to his/her buddy, User B.

Step 502: A node of User B is searched in the reverse buddy table of Server A, and recorded position information of server of User B corresponding to that node is examined.

Step 503: The position information of server of User B is checked to see if it is blank. If blank, it is indicated that User B has not logged in the instant messaging system, and step 504 is performed. Otherwise, step 505 is performed.

Step 504: Server A stores the message that User A sends to User B in a database. The process 500 ends.

Step 505: Determination is made as to whether the server in which User B is located is the present server. If it is the present server, step 506 is performed. Otherwise, step 507 is performed.

Step 506: Server A sends the message (that is sent from User A to User B of the present server) directly to User B. The process 500 ends.

Step 507: If the server in which User B is located is Server B, Server A transmits the message (that is sent from User A to User B) to Server B.

Step 508: Upon receiving the message transmitted from Server A, Server B determines whether a connection with User B exists. If a connection exists, step 509 is performed. Otherwise, step 511 is performed.

This step is performed in order to avoid the loss of the message that may result because Server B sends the message to User B while User B is in the process of logging off and Server B has not updated the stored information of User B.

Step 509: Server B sends the message that is transmitted from Server A to User B.

Step 510: Server B sends a notification indicating a successful delivery of the message to Server A. The process 500 ends.

Step 511: Server B sends a notification indicating a failed delivery of the message to Server A.

Step 512: Server B stores the message in a database. The process 500 ends.

If User B is not a buddy of User A but (1) a user who is among the users that are connected with Server A has added User B as his/her buddy and (2) information of User B exists in the reverse buddy table of Server A, then the process of sending a message from User A to User B is the same as the above process.

Figure 6:
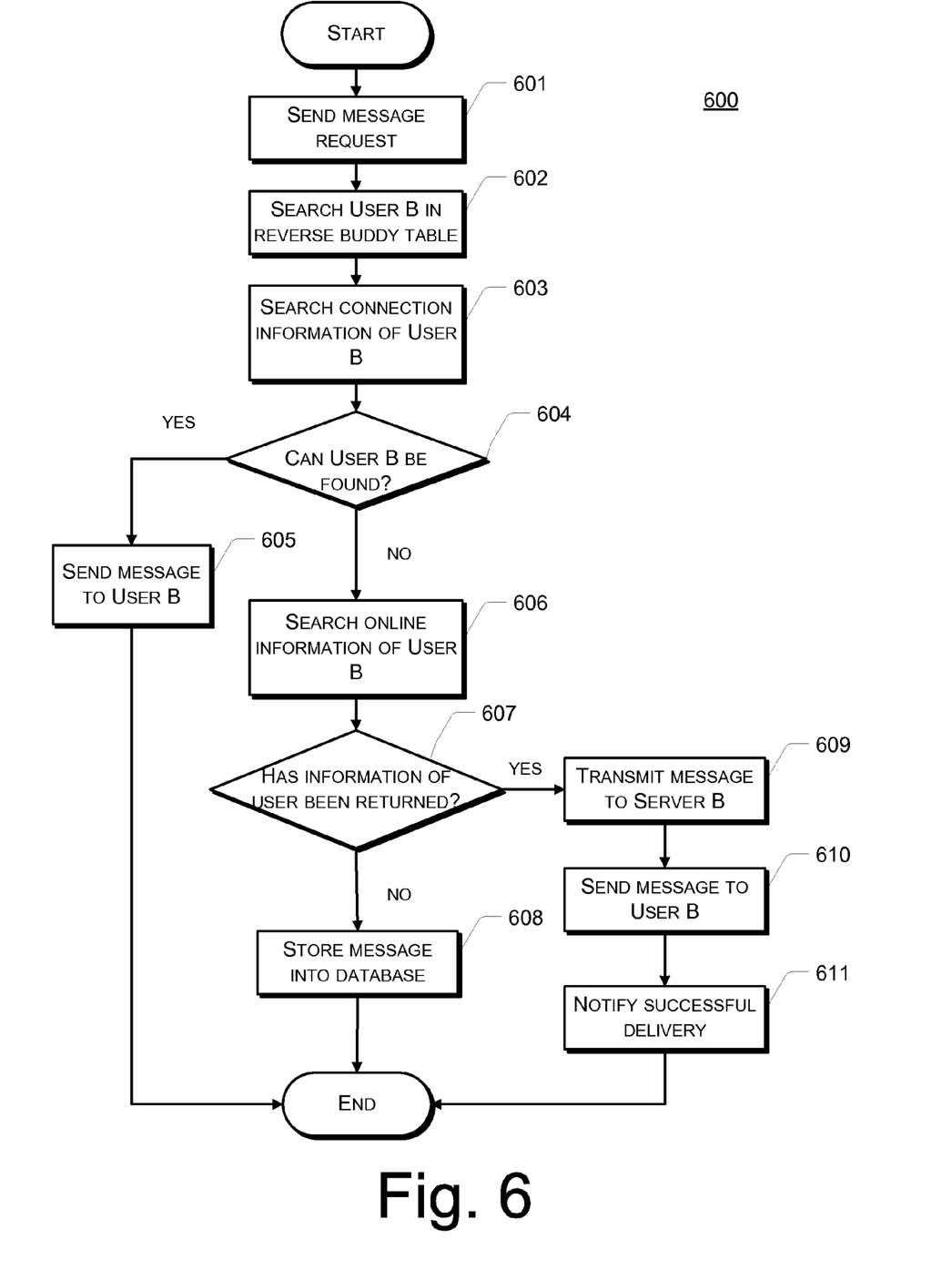
FIG. 6 shows another flow chart of a process of sending a message from a user in accordance with the present disclosure.

FIG. 6 shows a process 600 of sending a message from User A to User B when User B is not a buddy of User A and information of User B does not exist in a reverse buddy table of Server A. The process 600 includes the following:

Step 601: User A who connects with Server A requests Server A to send a message to his/her buddy, User B.

Step 602: A node of User B is searched in the reverse buddy table of Server A. However, no such a node is found in the reverse buddy table.

Step 603: Server A locally searches a connection with User B.

Step 604: Determination is made as to whether information regarding a connection with User B exists locally. If such a connection exists, step 605 is performed. Otherwise, step 606 is performed.

Step 605: Server A sends the message directly to User B. The process 600 ends.

Step 606: Server A submits a request for online information of User B by way of multicasting.

Step 607: Server A determines whether the online information of User B has been received. If not received, step 608 is performed. Otherwise, step 609 is performed.

Step 608: Server A stores the message in a database. The process 600 ends.

Step 609: Upon receiving the online information of User B from Server B, Server A establishes a node of User B in the reverse buddy table of the present server, records the position information of server of User B corresponding to the node to be Server B and leaves associated reverse buddy list blank. Server A transmits the message that User A sends to User B to Server B.

Step 610: Server B sends the message to User B.

Step 611: Server B sends a notification indicating a successful delivery of the message to Server A. The process 600 ends.

Figure 7:
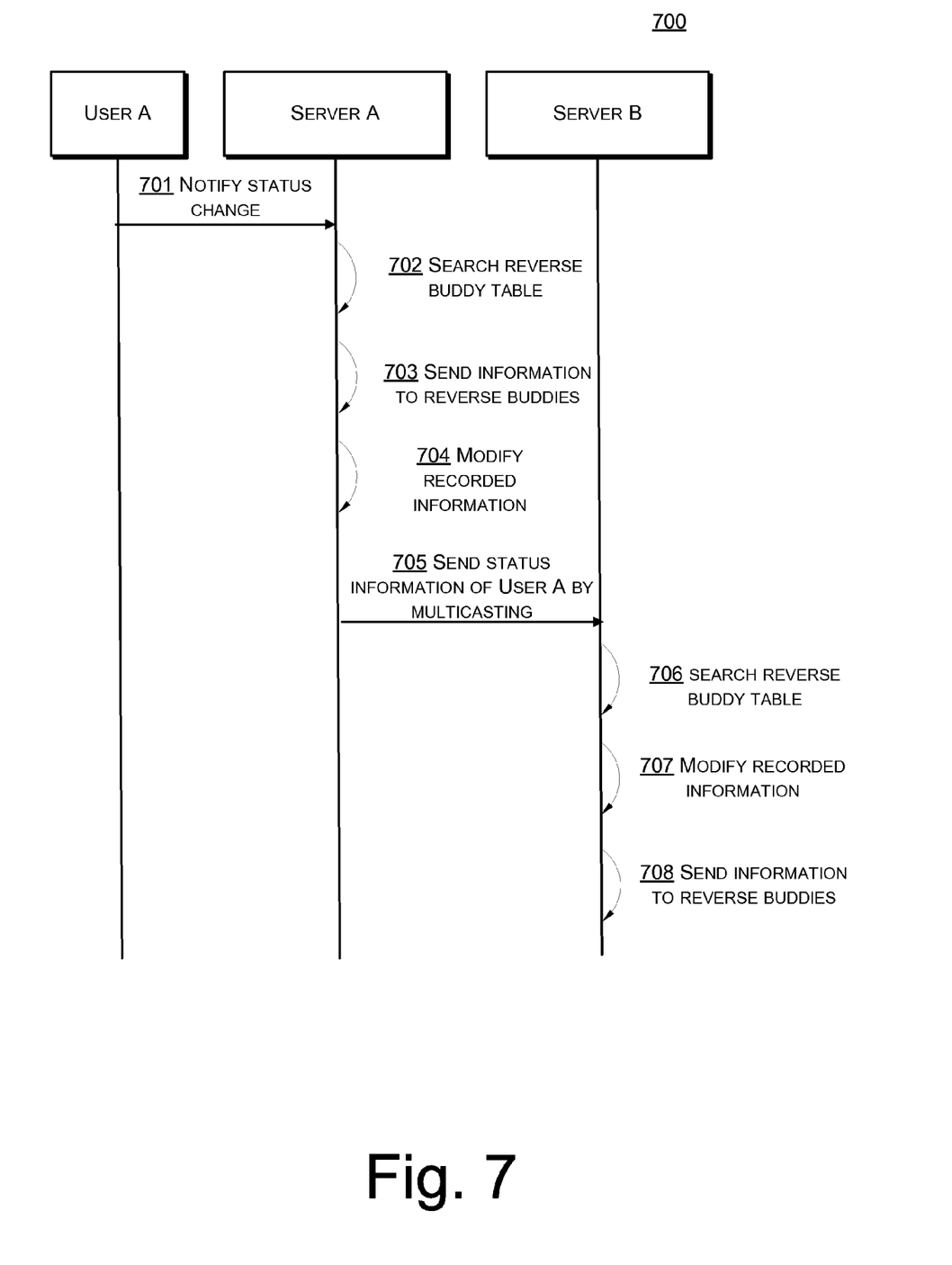
FIG. 7 shows a timing sequence diagram of handling a user logout process in accordance with the present disclosure.

FIG. 7 shows a process 700 of handling user logout. The process 700 includes the following:

Step 701: User A of Access Server A submits a logout message to Server A.

Step 702: Server A examines whether a node of User A exists in the reverse buddy table of the present server. If such a node exists, reverse buddy identification are found from the reverse buddy list of that node and step 703 is performed. Otherwise, no processing is performed.

Step 703: Based on reverse buddy identification that have been found, Server A sends related users the logout message of User A.

Step 704: Based on the reverse buddy identification that have been found, Server A searches for corresponding nodes in the buddy table and the reverse buddy table of the present server. Upon finding corresponding nodes, information of User A that has been recorded in corresponding nodes is removed. Moreover, the position information of server of User A in the node of User A that is within the reverse buddy table is cleared.

Step 705: Server A sends out the logout message of User A in the instant messaging system by way of multicasting.

Step 706: Upon receiving the multicasting message, Server B in the instant messaging system examines whether a node of User A exists in the reverse buddy table of the present server. If a node of User A exists in the reverse buddy table of the present server, reverse buddy ID are found in the reverse buddy list of the node of User A, and step 707 is performed. Otherwise, no processing is performed.

Step 707: Server B clears the position information of server of the node of User A from the reverse buddy table.

Step 708: Based on the reverse buddy identification that has been found, Server B sends the logout message of User A to related users.

The disclosed method of the present disclosure manages information of users and respective contacts in a server by establishing a buddy table and a reverse buddy table of the users in the server, and stores, in the local server, the information of the users that originally needs to be obtained by frequent accesses to user information management servers. Therefore, not only will network overhead be reduced, but the searching performance and managing performance of user information are also improved.

In practical implementations, two data structures of memory may be established in the access server and are separately used for recording data associated with the buddy table and the reverse buddy table. The disclosed method of the present disclosure has been examined and found to be plausible through actual implementations and statistical analysis.

Assume that each access server in an instant messaging system is accessed by fifty thousand users and each user has one hundred buddies and one hundred reverse buddies on average. Therefore, information of 50000*(100+100)=10M number of buddies will be stored. If thirty-two bytes are reserved for information of each buddy, a total of 320M of memory are occupied. Given that an existing mainstream server normally has 2 G to 4 G of RAM, it is therefore plausible to use RAM. Furthermore, as ID are used as indices for buddy table and reverse buddy table, the ID can be placed in a memory pool and are subsequently represented by pointers, thereby further reducing the actual occupancy of the memory.

Moreover, using the present disclosure may reduce network overhead. In existing technologies, when online information of a user changes, the information of the user is needed to send to a user information management server and occupies a time unit of network transmission. When the disclosed method of the present disclosure is used, the change of online information of the user is sent to each equivalent access server through UDP multicasting and occupies a time unit of network transmission.

Furthermore, when information of a user is being searched, existing technologies require looking into the user information management server to find the access server to which the user is connected. If multiple user information management servers exist, associated search needs to be performed in those servers. This not only increases network overhead but also reduces searching efficiency. The exemplary embodiments of the present disclosure allow user information to be saved in the access server, thus saving searching time, reducing network overhead and improving searching efficiency.

The method disclosed in the present disclosure is also suitable for use in large-scale instant messaging systems that have user clients sent messages through P2P. As corresponding method follows the same principles herein, corresponding method is not described then.

Evidently, a technical person in the art can alter or modify the present disclosure in many different ways without departing from the spirit and the scope of this disclosure. Accordingly, it is intended that the present disclosure covers all modifications and variations if these modifications and variations fall within the scope of the claims of the present disclosure and their equivalents.

The invention claimed is:

1. A method for managing user information in an instant messaging system, the method comprising:
   establishing, in a first computer access server, a first buddy table that stores buddy information of a user and a first reverse buddy table that stores reverse buddy information of the user;
   associating an identifier of the user with local buddy information of the user in the first buddy table;
   associating the identifier of the user with local reverse buddy information of the user;
   recording position information of a buddy in the first reverse buddy table;
   obtaining, by the first computer access server, contact information of contacts of the user who is logged into the first computer access server from a client device;
   updating the first buddy table and the first reverse buddy table stored locally at the first computer access server, based at least in part on the contact information and user information of the user, wherein the user information of the user includes identification information of the user;
   sending a notification, by the first computer access server, to notify a plurality of other computer access servers including a second computer access server of user information of the user, wherein the second computer access server stores a second buddy table and a second reverse buddy table locally;

determining whether the identification information of the user exists in the second reverse buddy table of the second computer access server;

storing, by the second computer access server which receives the notification, the user information of the user in the event that the second computer access server determines that the identification information of the user exists in the second reverse buddy table of the second computer access server;

sending, by the first computer access server, status information of the contacts of the user to a client terminal of the user; and sending status information of the user to related contacts by the second computer access server, wherein the contact information of the contacts of the user comprises the buddy information and the reverse buddy information of the user.

2. The method as recited in claim 1, wherein the obtaining and storing the contact information of the contacts of the user by the first computer access server comprises:

finding buddy identifiers and reverse buddy identifiers of the user from a database by the first computer access server to which the user logs on;

finding the buddy identifiers in the first reverse buddy table by the first computer access server; and recording the identifier of the user into respective associated reverse buddy information upon finding the buddy identifiers;

finding the reverse buddy identifiers in the first buddy table of the first computer access server; and recording the identifier of the user in respective associated buddy information upon finding the reverse buddy identifiers.

3. The method as recited in claim 2, further comprising:

recording a buddy identifier in the first reverse buddy table when the buddy identifier is not found in the first reverse buddy table;

treating the identifier of the user to be reverse buddy information; and associating the buddy identifier with the identifier.

4. The method as recited in claim 2, further comprising:

recording a reverse buddy identifier in the first buddy table when the reverse buddy identifier is not found in the first buddy table;

treating the identifier of the user to be buddy information; and associating the reverse buddy identifier with the identifier.

5. The method as recited in claim 2, wherein, after the user logged in the first computer access server, the method further comprises:

searching, by the first computer access server, for the identifier of the user in the first buddy table stored locally at the first computer access server;

obtaining all local buddy identifiers from corresponding buddy information upon finding the identifier; and recording position information of the first computer access server in respective position information associated with the local buddy identifiers in the first reverse buddy table.

6. The method as recited in claim 5, wherein, after the first computer access server notifies the user information of the user to the second computer access server and after the second computer access server finds the identifier of the user, the second computer access server records the position information of the user in position information that is associated with the identifier, and sends the status information of the user to related users based on user identifiers that are associated with the identifier in the reverse buddy information.

7. The method as recited in claim 5, further comprising:

when the first computer access server requests the status information of the user from the second computer access server, the second computer access server searching the identifier of the user in the second buddy table and the second reverse buddy table stored locally at the second computer access server and returning user identifiers in associated buddy information to the first computer access server.

8. The method as recited in claim 7, further comprising:

the first computer access server searching within the first reverse buddy table stored locally at the first computer access server for the user identifiers returned by the second computer access server; and recording position information of users associated with the user identifiers in respective associated position information upon finding the user identifiers.

9. The method as recited in any one of claim 2, further comprising:

when a change in status of the user occurs, the first computer access server notifying the second computer access server of the change in status of the user; and when the second computer access server finds the identifier of the user in the second reverse buddy table, sending the information of the status change of the user to related users based on the user identifiers in the reverse buddy information that is associated with the identifier.

10. The method as recited in claim 9, further comprising:

when the status of the user changes to logout, the first computer access server removing the information of the user that is associated with the user identifier from the first buddy table and the first reverse buddy table stored locally at the first computer access server; and upon finding the identifier of the user in the second reverse buddy tables, the second computer access server clearing respective position information associated with the identifier.

11. The method as recited in claim 9, further comprising:

when the user sends an instant message to a contact and the first computer access server finds an identifier of the contact in the first reverse buddy table stored locally at the first computer access server, the first computer access server transmitting the instant message based on position information associated with the identifier of the contact.

12. The method as recited in claim 11, further comprising:

when the first computer access server cannot find the identifier of the contact in the first reverse buddy table stored locally at the first computer access server, the first computer access server requesting contact information of the contact of the user from the second computer access server, receiving the contact information from the second computer access server, and transmitting the instant message based on the received contact information of the contact.

13. The method as recited in claim 9, wherein the first computer access server sends notifications and requests to the second computer access server by multicasting.

14. The method as recited in claim 1, wherein in the event that the buddy of the user is not logged into a computer access server, the position information of the buddy is blank.

15. The method as recited in claim 1, wherein in the event that the buddy of the user is logged into a computer access server, the position information of the buddy corresponds to an identifier of the computer access server that the buddy is logged into.

16. A communication system, comprising:
a first computer access server that:
  stores a first buddy table and a first reverse buddy table locally, wherein the first buddy table stores buddy information of a user and the first reverse buddy table stores reverse buddy information of the user;
  associates an identifier of the user with local buddy information of the user in the first buddy table;
  associates the identifier of the user with local reverse buddy information of the user;
  records position information of a buddy in the first reverse buddy table; and
  sending status information of the contacts of the user to a client terminal of the user; and
a second computer access server that:
  allows the user to log in;
  obtains and stores contact information of contacts of the user;
  updates a second buddy table and a second reverse buddy table stored locally at the second computer access server, based at least in part on the contact information and user information of the user, wherein the user information of the user includes an identifier of the user;
  sends a notification to a plurality of other computer access servers including the first computer access server of user information of the user;
  searches for the information of the contacts of the user locally or causes the first computer access server to search for the information of the contacts of the user;
  transmits instant messages to the first computer access server;
  receives instant messages from the first computer access server; and
  sending status information of the user to related contacts,
wherein the contact information of the contacts of the user comprises the buddy information and the reverse buddy information of the user.

17. The system as recited in claim 16, wherein the second buddy table comprises an identifier of the user and information of the user's buddies that are local to the second computer access server, and wherein the second reverse buddy table comprises the identifier of the user, the reverse buddy information of the user and position information of the user.

* * * * *

UNITED STATES PATENT AND TRADEMARK OFFICE
CERTIFICATE OF CORRECTION

PATENT NO. : 8,554,785 B2
APPLICATION NO. : 12/676821
DATED : October 8, 2013
INVENTOR(S) : Kong et al.

It is certified that error appears in the above-identified patent and that said Letters Patent is hereby corrected as shown below:

In the claims,

In column 12, line 22, claim 9, delete "any one of".

Signed and Sealed this
Twenty-eighth Day of June, 2016

Michelle K. Lee
*Director of the United States Patent and Trademark Office*